United States Patent
Fang et al.

(10) Patent No.: US 8,475,541 B2
(45) Date of Patent: Jul. 2, 2013

(54) DIESEL FUEL ADDITIVE

(75) Inventors: Xinggao Fang, Richmond, VA (US); Julie Galante-Fox, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 356 days.

(21) Appl. No.: 12/815,033

(22) Filed: Jun. 14, 2010

(65) Prior Publication Data
US 2011/0302828 A1 Dec. 15, 2011

(51) Int. Cl.
*C10L 1/22* (2006.01)

(52) U.S. Cl.
USPC ............................. 44/331; 44/347; 44/415

(58) Field of Classification Search
USPC ............................ 44/331, 347, 415
See application file for complete search history.

(56) References Cited

U.S. PATENT DOCUMENTS

| | | | |
|---|---|---|---|
| 3,401,118 A * | 9/1968 | Benoit, Jr. ................. | 508/293 |
| 4,533,361 A | 8/1985 | Sung et al. | |
| 5,039,307 A | 8/1991 | Herbstman et al. | |
| 5,916,825 A | 6/1999 | Cherpeck | |
| 6,114,542 A | 9/2000 | Cherpeck | |
| 6,299,655 B1 | 10/2001 | Steckel et al. | |
| 6,511,518 B1 | 1/2003 | Houser | |
| 6,548,458 B2 | 4/2003 | Loper | |
| 7,645,728 B2 | 1/2010 | Esche et al. | |
| 8,016,898 B1 | 9/2011 | Lange et al. | |
| 2004/0180797 A1 | 9/2004 | Huffer et al. | |
| 2005/0215441 A1 * | 9/2005 | Mackney et al. ............ | 508/291 |
| 2006/0218854 A1 | 10/2006 | Barbour et al. | |
| 2006/0277819 A1 | 12/2006 | Puri et al. | |
| 2007/0151144 A1 | 7/2007 | Hou et al. | |
| 2007/0245620 A1 | 10/2007 | Malfer et al. | |
| 2008/0274924 A1 * | 11/2008 | Lange et al. ................. | 508/542 |
| 2009/0229176 A1 | 9/2009 | Breakspear et al. | |

FOREIGN PATENT DOCUMENTS

| | | |
|---|---|---|
| CA | 2453249 A | 4/2009 |
| CN | 100378207 A | 4/2008 |
| CN | 101565479 A | 10/2009 |
| JP | 59008790 A | 1/1984 |
| WO | 2009040583 A1 | 4/2009 |
| WO | WO2009040586 | 4/2009 |

OTHER PUBLICATIONS

Herbstman, Sheldon; Use of Dispersants/Detergents in Diesel Injector Keep Clean and Clean Up Studies; Oct. 1991; Article Abstract; SAE International.

* cited by examiner

*Primary Examiner* — Cephia D Toomer
(74) *Attorney, Agent, or Firm* — Luedeka Neely Group, P.C.

(57) ABSTRACT

A diesel fuel additive composition, a fuel containing the fuel additive, a method for improving diesel engine performance using the additive and a method for making the additive for diesel engines having a high pressure fuel injection system. The fuel additive has a number average molecular weight ($M_n$) of from about 500 to about 10,000 and is selected from a hydrocarbyl-substituted succinic acid or anhydride or derivative thereof and a hydrocarbyl-substituted Mannich base. The additive has a molecular weight distribution such that less than about 25 wt. % of the additive has a molecular weight of 400 or less as measured by gel permeation chromatography (GPC) based on a polystyrene calibration curve.

7 Claims, 2 Drawing Sheets

DIESEL FUEL ADDITIVE

TECHNICAL FIELD

The disclosure relates to additives for fuel and in particular to diesel fuel additives that provide improved injector performance.

BACKGROUND AND SUMMARY

The indirect injection diesel engine has now given way in the market place to more modern direct injection light duty diesel engines for reasons of fuel economy, performance, and low emissions. However, direct injection diesel engines are much more sophisticated than the earlier indirect injection engines and require more precise calibration be maintained in order to maintain their design performance. The injectors, pumps, filters and other components of the fuel delivery system of the engine are vulnerable to having their operation perturbed by fouling from deposits resulting from combustion of fuel.

Direct injection engines may also use a high pressure common rail fuel system. Recent problems have arisen with the use of ultra low sulfur diesel fuels when used in such high pressure common rail fuel systems. By "high pressure" herein is meant those pressures in diesel fuel systems that are equal to or greater than 15,000 psi (greater than or equal to 1000 bar). Such problems are evident by occurrence of sediment in the fuel additive packages, internal injector deposits, and injector sticking. Accordingly, there was a need to discover the source of the deposit and injector problem when operating engines on ultra-low sulfur fuels, i.e., fuels containing about 15 ppm by weight sulfur or less.

In view of the foregoing and other needs, an embodiment of the disclosure provides a diesel fuel additive composition that has a number average molecular weight ($M_n$) of from about 500 to about 10,000. The additive is selected from a hydrocarbyl-substituted succinic acid or anhydride or derivative thereof, and a hydrocarbyl-substituted Mannich base, wherein the additive has a molecular weight distribution such that less than about 25 wt. % of the additive has a molecular weight of 400 or less as measured by gel permeation chromatography (GPC) based on a polystyrene calibration curve.

In another embodiment of the disclosure provides a method to reduce or prevent injector sticking or deposits in a high pressure common rail diesel engine having injectors and combusting a diesel fuel containing 15 ppm by weight or less sulfur. The method includes combusting in the engine a composition containing the diesel fuel and a diesel fuel additive having a number average molecular weight ($M_n$) of from about 500 to and 10,000. The additive is selected from a hydrocarbyl-substituted succinic acid or anhydride or derivative thereof, and a hydrocarbyl-substituted Mannich base, wherein the additive has a molecular weight distribution such that less than about 25 wt. % of the additive has a molecular weight of 400 or less as measured by gel permeation chromatography (GPC) based on a polystyrene calibration curve. Use of the fuel containing the additive is effective to reduce the occurrence of injector sticking relative to the occurrence of injector sticking in a comparable engine combusting a fuel containing a similar fuel additive having a molecular weight distribution such that more than 25 wt. % of the additive has a molecular weight of 400 or less as measured by GPC.

Another embodiment of the disclosure provides a method for improving an additive for an ultra-low sulfur diesel fuel in order to reduce deposits and injector sticking in high pressure diesel fuel injection system for a diesel engine. The method includes charging a hydrocarbyl component to a reaction vessel. The hydrocarbyl component is then vacuum distilled at a temperature above about 200° C. for a period of time sufficient to remove at least a portion of the hydrocarbyl components so that a distillation residue of the distilled hydrocarbyl component is effective to provide a diesel fuel additive having a number average molecular weight ($M_n$) of from about 500 to and 10,000 wherein less than about 25 wt. % of the additive has a molecular weight of 400 or less as measured by gel permeation chromatography (GPC) based on a polystyrene calibration curve. The additive is selected from a hydrocarbyl-substituted succinic acid or anhydride or derivative thereof, and hydrocarbyl-substituted Mannich base. The distillation residue of the hydrocarbyl component is then reacted with a component selected from an unsaturated dicarboxylic acid or anhydride and phenol or substituted phenol to provide a hydrocarbyl-substituted component. The hydrocarbyl-substituted component is then reacted with a reactant selected from an amine and amine plus an aldehyde to provide the additive having a molecular weight distribution of from about 500 to about 10,000, wherein less than 25 wt. % of the additive has a molecular weight of 400 or less as measured by GPC based on a polystyrene calibration curve.

Yet another embodiment of the disclosure provides a method for improving an additive for an ultra-low sulfur diesel fuel in order to reduce deposits and injector sticking in high pressure injection system for a diesel engine. The method includes charging a hydrocarbyl component to a reaction vessel and reacting the hydrocarbyl component with a component selected from an unsaturated dicarboxylic acid or anhydride to provide a hydrocarbyl-substituted component. The hydrocarbyl-substituted component is vacuum distilled at a temperature above about 200° C. for a period of time sufficient to remove at least a portion of the hydrocarbyl-substituted component so that a distillation residue of the distilled hydrocarbyl-substituted component is effective to provide a diesel fuel additive having a number average molecular weight ($M_n$) of from about 500 to and 10,000, wherein the additive has a molecular weight distribution such that less than about 25 wt. % of the additive has a molecular weight of 400 or less as measured by gel permeation chromatography (GPC) based on a polystyrene calibration curve. The distillation residue of the hydrocarbyl-substituted component is then reacted with a polar compound to provide the additive having a number average molecular weight ($M_n$) of from about 500 to about 10,000, wherein less than 25 wt. % of the additive has a molecular weight of 400 or less as measured by GPC.

Other embodiments of the disclosure may provide improved stability of a diesel fuel additive package containing a hydrocarbyl-substituted additive wherein less than 25% (by weight) of the additive has a molecular weight of 400 or less as determined by gel permeation chromatography (GPC) based on a polystyrene calibration curve.

Yet other embodiments of the disclosure may provide a method to reduce or prevent visible deposits on the internal parts of a diesel injector in a high pressure common rail diesel engine.

Another embodiment may improve a stability of a diesel fuel additive package containing a hydrocarbyl-substituted additive component by reducing a weight percent of additive precursors having relatively low molecular weight so that the resulting additive has a molecular weight distribution that contains less than 25 wt. % of additive having 400 molecular weight or less as determined by gel-permeation chromatography (GPC) based on a polystyrene calibration curve.

According to one or more embodiments of the disclosure, there may be a significant benefit in improved (reduced) injector sticking occurrence in high pressure common rail diesel fuel systems by reducing or eliminating a percentage of the fuel additive having a low molecular weight, that is, a molecular weight of 400 or less as determined by GPC using a polystyrene standard. It has been surprisingly discovered that deposits formed on injectors are composed primarily of material (lacquers, varnish, salts, etc) containing or derived from such low molecular weight portions of the typical distribution curve of the additive product. In fact, even a small amount, such as 10 wt. %, or 5 wt. % or less of such relatively low molecular weight component in the fuel additive, if present, may result in undesirable deposits, varnish and/or injector sticking. Eliminating or significantly reducing an amount of a relatively low molecular weight fraction of additive from an unmodified distribution curve for such additive, may dramatically improve the engine and injector performance.

DETAILED DESCRIPTION OF DISCLOSED EMBODIMENTS

Figure 1:
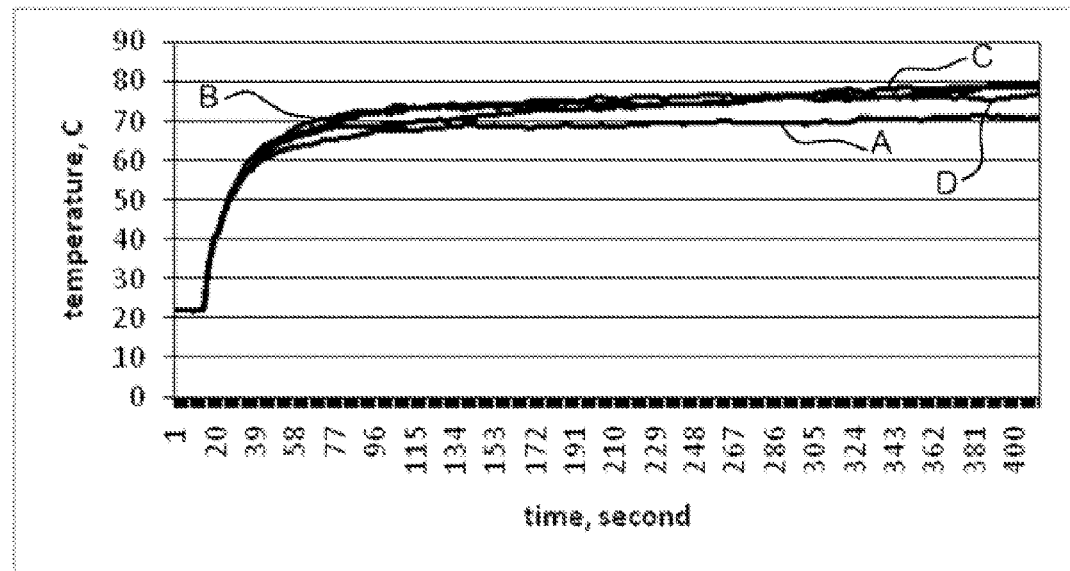
FIG. 1 is a graphical representation of exhaust gas temperature over time for cylinders in a Peugeot engine for a DW10 engine test with a baseline fuel containing no additive.

Further features, embodiments and advantages thereof may be provided by the following detailed description of embodiments of the disclosure. An important feature of the embodiments described herein is that the lowest and/or low molecular weight additive species in the additive having a unmodified molecular weight distribution curve are desirably removed by, for example, vacuum distillation from the bulk additive component. For example, a typical hydrocarbyl-substituted succinic imide dispersant or Mannich base may have a molecular weight distribution having a polydispersity ($M_w/M_n$) of 1.5 to about 4.0, wherein $M_w$ is a weight average molecular weight and $M_n$ is a number average molecular weight of the dispersant. In general, it is extremely difficult or expensive to produce dispersants having a polydispersity of less than about 1.5. Accordingly, the distribution curves for such dispersants have one or more conventional bell-shape portions containing dispersant components having molecular weights above and below the average. Such dispersants are referred to herein as "unmodified" dispersants or "conventional" dispersants.

The molecular weight of the hydrocarbyl component and/or fuel additive may be determined by gel permeation chromatography (GPC). The GPC separation method involves column chromatography in which the stationary phase is a heteroporous, solvent-swollen polymer network of a polystyrene gel varying in permeability over many orders of magnitude. As the liquid phase (tetrahydrofuran) containing the polymer sample passes through the gel, the polymer molecules diffuse into all parts of the gel not mechanically barred to them. The smaller molecules "permeate" more completely and spend more time in the column; the larger molecules "permeate" less and pass through the column more rapidly. The $M_n$ and $M_w$ values of the hydrocarbyl component may be obtained by comparing distribution data obtained from the GPC to a series of calibration standards of polymers of known molecular weight. The average molecular weight of the hydrocarbyl component or fuel additive according to the embodiments of the disclosure may be determined by GPC using a polystyrene calibration curve.

For the purposes of the disclosure, the term "hydrocarbyl group" or "hydrocarbyl" is used in its ordinary sense, which is well-known to those skilled in the art. Specifically, hydrocarbyl refers to a group having a carbon atom directly attached to the remainder of a molecule and having a predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, and sulfoxy);

(3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein, the term "major amount" is understood to mean an amount greater than or equal to 50 wt. %, for example from about 80 to about 98 wt. % relative to the total weight of the composition. Moreover, as used herein, the term "minor amount" is understood to mean an amount less than 50 wt. % relative to the total weight of the composition.

"Middle distillate fuel" as used herein may be, for example, a naphtha, kerosene or diesel fuel composition. It may be a heating oil, an industrial gas oil, a drilling oil, an automotive diesel fuel, a distillate marine fuel or a kerosene fuel such as an aviation fuel or heating kerosene. It may in particular be a diesel fuel composition. More particularly, a middle distillate fuel is a fuel that is suitable and/or adapted and/or intended for use in an internal combustion engine; for example an automotive fuel composition, and/or adapted and/or intended for use in an automotive diesel (compression ignition) engine. Such middle distillate fuel may be organically or synthetically derived, for example a petroleum derived or Fischer-Tropsch derived gas oil. A middle distillate fuel may have boiling points within the usual diesel range of from 125 or 150 to 400 or 550° C., depending on grade and use. A density of the middle distillate fuel may range from 0.75 to 1.0 g/cm$^3$, for example, from 0.8 to 0.86 g/cm$^3$, at 15° C. (IP 365) and a measured cetane number (ASTM D613) of from 35 to 80, suitably from 40 to 75 or 70. An initial boiling point of a middle distillate fuel may suitably be in the range 150 to 230° C. and the fuel may have a final boiling point in the range 290 to 400° C. A kinematic viscosity of the middle distillate fuel at 40° C. (ASTM D445) might suitably range from 1.5 to 4.5 mm$^2$/s (centistokes).

The diesel fuels of the disclosed embodiments may be applicable to the operation of both stationary diesel engines (e.g., engines used in electrical power generation installations, in pumping stations, etc.) and ambulatory diesel engines (e.g., engines used as prime movers in automobiles, trucks, road-grading equipment, military vehicles, etc.).

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

As set forth above, it has been found, unexpectedly, that reducing or eliminating relative low molecular weight components from the additive may provide significant advantages with respect to certain ultra-low sulfur diesel fuels, particularly when used in diesel engines having a high pressure common rail injector system. In order to reduce or eliminate relatively low molecular weight components from the additive, one or more precursors for the additive may be subjected in a reaction vessel to vapor pressure reduction via an overhead vacuum distillation process. Heat may be applied to the reaction vessel during the vacuum distillation process to enhance the process. During the vacuum distillation process, the lower molecular weight species, i.e., more volatile species, boil off first leaving a mixture in which the remaining fractions or distillation residues may be reacted to provide a major amount of additive having a molecular weight of greater than 400, such as greater than 500, desirably greater than 600 as determined by GPC using a polystyrene standard. By controlling the amount of vacuum and distillation temperature one may readily control the amount of relatively low molecular weight material removed from the reaction vessel. For example, a vacuum of about 700 to about 750 mm of Hg at a temperature ranging from about 190° to about 250° C. may be suitable for conducting vacuum distillation on the precursor component.

Alternative methods for removing the low molecular weight component may include, but are not limited to, inert gas stripping at an elevated temperature, thin film distillation and/or evaporation, and the like. In another alternative, the low molecular weight component may be removed by vacuum, stripping, or thin film distillation of the final additive product. According to embodiments of the disclosure, one or more of the hydrocarbyl component, the hydrocarbyl-substituted component, or the additive product may be subjected to one or more of the foregoing processes.

In one embodiment, the additive contains less than about 10 wt. % of additive components having a molecular weight of 400 or less by GPC using a polystyrene standard. In another embodiment the additive contains less than 5 wt. % of additive components having a molecular weight of 400 or less by GPC using a polystyrene standard. From a practical point of view it is not necessary to remove substantially all of the additive components having a molecular weight of 400 or less as determined by GPC from the additive in order to achieve the benefits of the disclosed embodiments. However, the stability of the additive may be improved and the performance of the diesel engine may be extended when the additive contains a relatively minor amount of the relatively low molecular weight additive components.

Unless specifically treated according to embodiments of the disclosure to remove or eliminate additive components having a molecular weight of 400 or less by GPC using a polystyrene standard, conventional additives as described above may have a distribution curve that includes a substantial quantity of relatively low molecular weight additive components. Even additives having a relatively high number average molecular weight ($M_n$) may contain sufficient low molecular weight additive components to form deposits or foul injectors in diesel engines having a high pressure common rail injector system.

In an aspect of the disclosed embodiments, the hydrocarbyl substituents of the hydrocarbyl-substituted succinic acid or anhydride or derivatives thereof and Mannich bases may be derived from polyolefins for example highly branched polyethylene, ethylene alpha-olefin copolymers, polypropylene, and butene polymers, for example polymers of isobutylene. Suitable polyisobutenes for use herein include those formed from polyisobutylene or highly reactive polyisobutylene having at least about 60%, such as about 70% to about 90% and above, terminal vinylidene content. Suitable polyisobutenes may include those prepared using $BF_3$ catalysts. The number average molecular weight ($M_n$) of the hydrocarbyl substituent may vary over a wide range, for example from about 500 to about 10,000, such as from about 500 to about 5000, as determined by GPC as described above.

When the additive is a succinic acid derivative or anhydride derivative, carboxylic reactants other than maleic anhydride may be employed such as maleic acid, fumaric acid, malic acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters. A mole ratio of maleic anhydride to hydrocarbyl component in the reaction mixture may vary widely. Accordingly, the mole ratio may vary from about 5:1 to about 1:5, for example from about 3:1 to about 1:3, and as a further example, the maleic acid or anhydride may be used in stoichiometric excess to force the reaction to completion. The unreacted maleic acid or anhydride may be removed by vacuum distillation.

A hydrocarbyl-substituted Mannich base may be prepared by reacting the hydrocarbyl component with a phenol or a substituted phenol, aldehyde or its precursor, and a polar compound.

The polar compound may include any of numerous amines, aminoalcohols, aminoacids, polyamines, alcohols, polyols, alkoxyalcohols, alkoxyamines, hydrazines, and the like. Such polar compounds may be used in preparing the hydrocarbyl-substituted succinic acid or anhydride or derivative thereof or Mannich base. Non-limiting examples of amines include methylamine, 2-ethylhexylamine, n-dodecylamine, stearylamine, N,N-dimethyl-propanediamine, N-(3-aminopropyl) morpholine, N-dodecyl-propanediamine, N-aminopropyl-piperazine, ethanolamine, N-ethanol-ethylenediamine and the like. Non-limiting exemplary polyamines may include aminoguanidine bicarbonate (AGBC), ethylenediamine, diethylene triamine (DETA), triethylene tetramine (TETA), tetraethylene pentamine (TEPA), pentaethylene hexamine (PEHA) and heavy polyamines. A heavy polyamine may comprise a mixture of polyalkylenepolyamines having small amounts of lower polyamine oligomers such as TEPA and PEHA, but primarily oligomers having seven or more nitrogen atoms, two or more primary amines per molecule, and more extensive branching than conventional polyamine mixtures. Additional non-limiting polyamines which may be used to prepare the hydrocarbyl-substituted additive component are disclosed in U.S. Pat. No. 6,548,458, the disclosure of which is incorporated herein by reference in its entirety. In an embodiment of the disclosure, the polyamine may be selected from tetraethylene pentamine (TEPA).

In an embodiment, the additive component may include compounds of following formula:

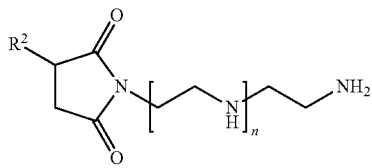

wherein n represents 0 or an integer of from 1 to 5, and $R^2$ is a hydrocarbyl substituent as defined above. In an embodiment, n is 3 and $R^2$ is a polyisobutenyl substituent, such as that derived from polyisobutylenes having at least about 60%, such as about 70% to about 90% and above, terminal vinylidene content. Compounds of the above formula may be the reaction product of a hydrocarbyl-substituted succinic anhydride, such as a polyisobutenyl succinic anhydride (PIBSA), and a polyamine, for example tetraethylene pentamine (TEPA).

The foregoing additive may have a molar ratio of (A) polyisobutenyl-substituted succinic anhydride to (B) polyamine in the range about 3:1 to about 1:2 in the additive. A particularly useful additive contains a polyisobutenyl group of the polyisobutenyl-substituted succinic anhydride having a number average molecular weight ($M_n$) in the range of from about 500 to 850 as determined by GPC and a (B) polyamine having a general formula $H_2N(CH_2)_m$—[NH$(CH_2)_m]_n$—$NH_2$, wherein m is in the range from 2 to 4 and n is in the range of from 1 to 3.

When formulating fuel containing the additive as described herein, the fuel may contain an amount of additive ranging from about 10 to about 10,000 ppmwv, such as from about 80 ppm to about 200 ppmwv. In aspects where a carrier is employed to provide a composition containing the additive to the fuel, the additive compositions may contain, on an active ingredients basis, an amount of the carrier ranging from about 10 mg to about 1000 mg of carrier per kg of fuel, such as about 25 mg to about 700 mg of carrier per kg of fuel. The active ingredient basis excludes the weight of (i) unreacted components associated with and remaining in the additives as produced and used, and (ii) solvent(s), if any, used in the manufacture of the disclosed additives either during or after its formation but before addition of a carrier, if a carrier is employed.

The additive of the present disclosure may be blended into a base fuel individually or in various sub-combinations. In some embodiments, the additive of the present disclosure may be blended into a fuel concurrently using an additive concentrate, as this takes advantage of the mutual compatibility and convenience afforded by the combination of ingredients when in the form of an additive concentrate. Also, use of a concentrate may reduce blending time and lessen the possibility of blending errors.

One or more additional optional additives may be present in the fuel compositions disclosed herein. For example, the fuel compositions may contain antifoam agents, additional dispersants, detergents, antioxidants, thermal stabilizers, carrier fluids, metal deactivators, dyes, markers, corrosion inhibitors, biocides, antistatic additives, drag reducing agents, friction modifiers, demulsifiers, emulsifiers, dehazers, anti-icing additives, antiknock additives, surfactants, cetane improvers, corrosion inhibitors, cold flow improvers, pour point depressants, solvents, demulsifiers, lubricity additives, extreme pressure agents, viscosity index improvers, seal swell agents, amine stabilizers, combustion improvers, dispersants, conductivity improvers, organic nitrate ignition accelerators, manganese tricarbonyls compounds, and mixtures thereof. In some aspects, the fuel additive compositions described herein may contain about 10 wt. % or less, or in other aspects, about 5 wt. % or less, based on the total weight of the additive or fuel composition, of one or more of the above additives. Similarly, the fuel compositions may contain suitable amounts of fuel blending components such as methanol, ethanol, dialkyl ethers, and the like.

In order to further illustrate features and advantages of the disclosed embodiments, the following non-limiting examples are provided. For the purposes of the following examples, the molecular weight of the additives was measured by gel permeation chromatography (GPC) with tetrahydrofuran (THF) as a solvent. Polystyrene standards of desired molecular weight ranges were used as the standards.

Example 1

A fuel additive was produced from the reaction of polyisobutylene succnic anhydride (PIBSA) with tetraethylenepentamine (TEPA) in a molar ratio of PIBSA to TEPA of 1.1:1.0. A modified procedure as described in U.S. Pat. No. 5,752,989 was used to prepare the additive. During the preparation of the additive, extended vacuum stripping was used to remove low molecular weight components at various stages of the process. The resulting product had a number average molecular weight ($M_n$) of 1387 as measured by GPC. The amount of components having a molecular weight of 400 or less as measured by GPC remaining in the product was 2.7 wt. %. The resulting product was diluted with an aromatic process fluid to the weight ratio of 25:75 product to process oil to form a homogenous clear and bright solution in a glass jar. The solution was exposed to atmospheric conditions at 22° C. to determine the stability of the additive. After 16 hours, the solution remained clear and bright without sedimentation.

Example 2

An additive was made similar to that of Example 1 except the PIBSA to TEPA ratio was 1.0:1.0. The product had an $M_n$ of 1420 and the amount of components having a molecular weight of 400 or less as measured by GPC remaining in the product was 2.8 wt. %. When diluted and exposed to the same atmospheric conditions as in Example 1, the mixture remained clear and bright without sedimentation.

Example 3

Comparative Example

An additive was made as described in example 2 except that no extra vacuum stripping was used during the reaction to remove low molecular weight components, other than vacuum stripping to remove unreacted maleic anhydride. The product had an $M_n$ of 1092 and the amount of components having a molecular weight of less than 400 as measured by GPC was 5.9 wt. %. When exposed to the same atmospheric conditions as Example 2, a brownish sediment formed at the bottom of the glass jar.

In the following examples, the effect the additives made according to methods of Examples 1-3 had on diesel fuel for high pressure common rail diesel fuel systems was evaluated. A DW10 test that was developed by Coordinating European Council (CEC) was used to demonstrate the propensity of fuels to provoke fuel injector fouling and was also used to demonstrate the ability of certain fuel additives to prevent or control these deposits. Injector sticking evaluation used the protocol of CEC F-98-08 for direct injection, common rail diesel engine nozzle coking tests. An engine dynamometer test stand was used for the installation of the Peugeot DW10 diesel engine for running the injector coking tests. The engine was a 2.0 liter engine having four cylinders. Each combustion chamber had four valves and the fuel injectors were DI piezo injectors have a Euro V classification.

The core protocol procedure consisted of running the engine through a cycle for 8-hours and allowing the engine to soak (engine off) for a prescribed amount of time. The foregoing sequence was repeated four times. At the end of each hour, a power measurement was taken of the engine while the engine was operating at rated conditions. The injector fouling propensity of the fuel was characterized by a difference in observed rated power between the beginning and the end of the test cycle.

Test preparation involved flushing the previous test's fuel from the engine prior to removing the injectors. The test injectors were inspected, cleaned, and reinstalled in the engine. If new injectors were selected, the new injectors were put through a 16-hour break-in cycle. Next, the engine was started using the desired test cycle program. Once the engine was warmed up, power was measured at 4000 RPM and full load to check for full power restoration after cleaning the injectors. If the power measurements were within specification, the test cycle was initiated. The following Table 1 provides a representation of the DW10 coking cycle that was used to evaluate the fuel additives according to the disclosure.

TABLE 1

One hour representation of DW10 coking cycle.

| Step | Duration (minutes) | Engine speed (rpm) | Load (%) | Torque (Nm) | Boost air after Intercooler (° C.) |
|---|---|---|---|---|---|
| 1 | 2 | 1750 | 20 | 62 | 45 |
| 2 | 7 | 3000 | 60 | 173 | 50 |
| 3 | 2 | 1750 | 20 | 62 | 45 |
| 4 | 7 | 3500 | 80 | 212 | 50 |
| 5 | 2 | 1750 | 20 | 62 | 45 |
| 6 | 10 | 4000 | 100 | * | 50 |
| 7 | 2 | 1250 | 10 | 25 | 43 |
| 8 | 7 | 3000 | 100 | * | 50 |
| 9 | 2 | 1250 | 10 | 25 | 43 |
| 10 | 10 | 2000 | 100 | * | 50 |
| 11 | 2 | 1250 | 10 | 25 | 43 |
| 12 | 7 | 4000 | 100 | * | 50 |

Example 4

Injector Sticking Engine Test

Diesel engine nozzle coking tests were conducted using the Peugeot DW10 engine following CEC F-98-08 protocol of Table 1. The engine was run with diesel fuel (PC10) without an additive to establish a baseline. No injector sticking was observed, as indicated by a uniform exhaust gas temperature for all 4-cylinders as shown in (FIG. 1). In FIG. 1, curve A is cylinder 1, curve B is cylinder 2, curve C is cylinder 3 and curve D is cylinder 4.

Example 5

In this example, an additive made according to Examples 1 and 2 having an $M_n$ by GPC of 1462 and having 2.5 wt. % of components having a molecular weight of 400 or less was mixed into the fuel in the amount 180 ppmwv (weight per volume of diesel fuel). The engine was run for up to 32 hours without injector sticking.

Example 6

Comparative Example

Figure 2:
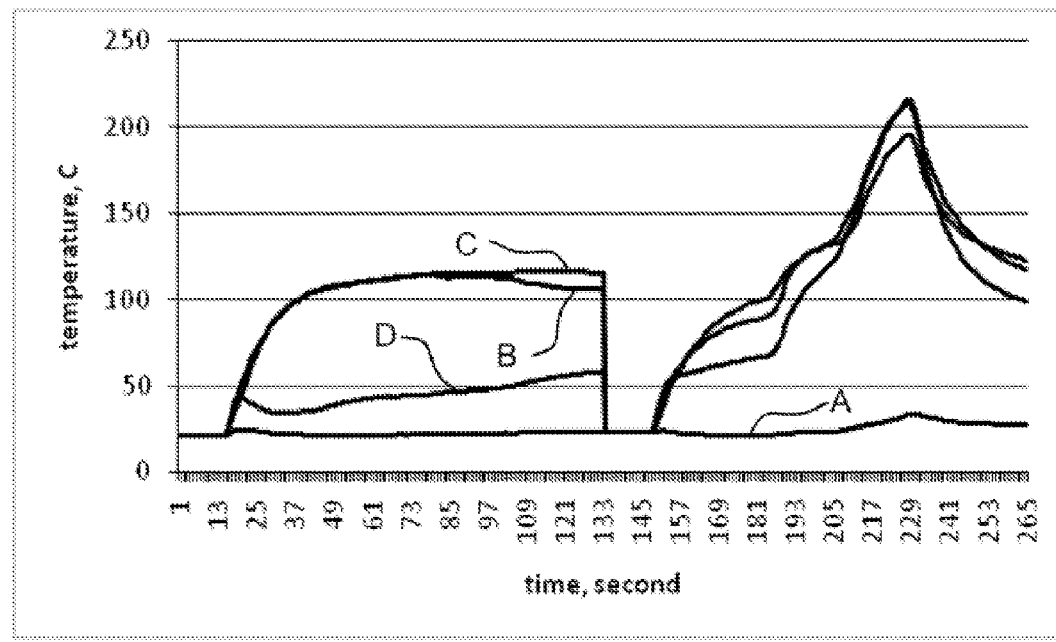
FIGS. 2 and 3 are graphical representations of exhaust gas temperatures over time for cylinders in a Peugeot engine for a DW10 engine test with conventional fuel additives.

An additive made without extra vacuum stripping according to the method of comparative example 3 was added to a diesel fuel in the amount of 112 ppmwv. The additive had $M_n$ of 610 by GPC, a molecular weight distribution ($M_w/M_n$) of 1.61, and contained 18.0 wt. % of components having a molecular weight of 400 or less. The engine was run for 8 hours on the fuel and restarted after the engine cooled down. Two injectors (curves B and C) were stuck as indicated by low exhaust gas temperatures at end the 8 hours as shown in FIG. 2. Physical inspection of the injectors upon completion of the test confirmed that the two injectors were stuck.

Example 7

Comparative Example

Figure 3:
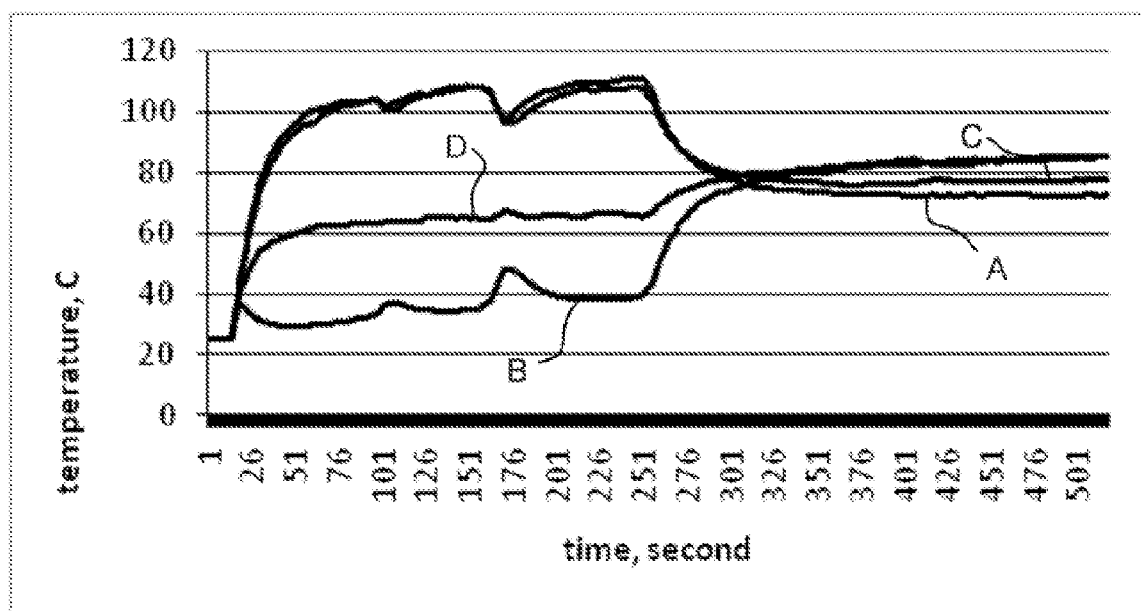

Another comparative example was run similar to Example 6 with the exception that the additive was used in an amount of 113 ppmwv. Two injectors were found stuck after 8 hours as shown by FIG. 3.

As indicated by the foregoing examples, fuel additives containing a significant amount of components having a molecular weight of 400 by GPC or less may result in injector sticking. Unexpectedly, when the additive has only a minor amount of components having a molecular weight of 400 or less by GPC, the fuel performs exceptionally well in a DW10 test with no injector sticking.

While the foregoing examples illustrate the use of additives containing the reaction product with TEPA as the polar head of the additive component, it is expected that the use of a less polar head such as a reaction product made with a monoamine, diamine, or alcohol may provide improved injector performance even if the additive contains up to about 25 wt. % of the low molecular weight component.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

That which is claimed is:

1. A diesel fuel additive composition comprising:
a diesel fuel additive having a number average molecular weight of from about 500 to about 10,000 and being selected from a hydrocarbyl-substituted acid or anhydride or derivative thereof, wherein the additive has been treated to remove components of the additive having a molecular weight of 400 or less so that the additive has a molecular weight distribution wherein from about 1.4 to about 5 wt. % of the additive has a molecular weight of 400 or less as measured by gel permeation chromatography (GPC) based on a polystyrene calibration curve.

2. The diesel fuel additive composition of claim 1, wherein the additive comprises a polyisobutenyl-substituted acid or anhydride imide that is prepared by the reaction of a polyisobutenyl-substituted succinic acid or anhydride and a polyamine.

3. The diesel fuel additive composition of claim 2, wherein the additive has a molar ratio of (A) polyisobutenyl-substituted succinic acid or anhydride moiety to (B) polyamine moiety in the range about 3:1 to about 1:2, wherein the polyisobutenyl group of the polyisobutenyl-substituted succinic acid or anhydride has a number average molecular weight ($M_n$) in the range of from about 500 to 5000 and the (B) polyamine has a general formula $H_2N(CH_2)_m$—[NH$(CH_2)_m]_n$—$NH_2$, wherein m is in the range from 2 to 4 and n is in the range of from 0 to 3.

4. The diesel fuel additive composition of claim 1, wherein the hydrocarbyl-substituted succinic acid or anhydride or derivative thereof comprises a reaction product of a polyisobutenyl-substituted succinic acid or anhydride with a polar compound selected from the group consisting of hydrazine, an alcohol, an amino alcohol, an alkoxylated amine, an alkoxylated alcohol, and a polyol.

5. An ultra-low sulfur diesel fuel comprising the diesel fuel additive composition of claim 1.

6. A method for reducing the occurrence of injector sticking in a high pressure diesel fuel injection system in a diesel engine having injectors and combusting a diesel fuel containing 15 ppm by weight or less sulfur, said method comprising combusting in said engine a composition comprising said diesel fuel and a diesel fuel additive having a number average molecular ($M_n$) weight of from about 500 to and 10,000 and being selected from a hydrocarbyl-substituted succinic acid or anhydride or derivative thereof, wherein the additive has been treated to remove components of the additive having a molecular weight of 400 or less so that the additive has a molecular weight distribution wherein from about 1.4 to about 5 wt. % of the additive has a molecular weight of 400 or less as measured by gel permeation chromatography, whereby the occurrence of injector sticking is reduced relative to the occurrence of injector sticking in a comparable engine combusting fuel comprising a fuel additive having a molecular weight distribution such that more than 5 wt. % of the fuel additive has a molecular weight of 400 or less as measured by gel permeation chromatography (GPC) based on a polystyrene calibration curve.

7. The method of claim 6, wherein the additive comprise a derivative of a polyisobutenyl-substituted succinic acid or anhydride prepared by reacting a polyisobutenyl-substituted succinic acid or anhydride with a polyamine.

* * * * *